June 10, 1952 W. J. STRONG 2,600,282
APPARATUS FOR TUMBLING RUBBER ARTICLES
Filed Dec. 7, 1950 3 Sheets-Sheet 2

Inventor
Walter J. Strong
By
Atty

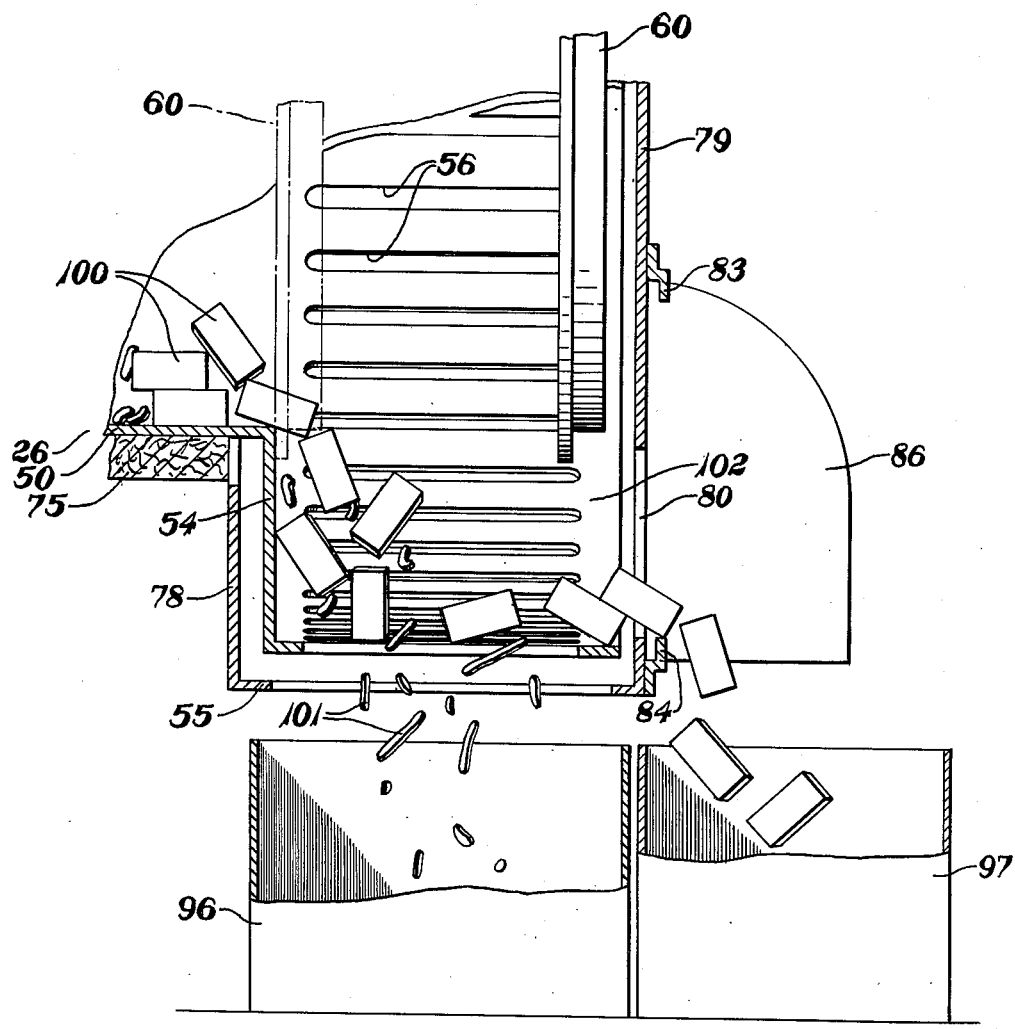

Patented June 10, 1952

2,600,282

UNITED STATES PATENT OFFICE 2,600,282

APPARATUS FOR TUMBLING RUBBER ARTICLES

Walter J. Strong, Cuyahoga Falls, Ohio, assignor to The B. F. Goodrich Company, New York, N. Y., a corporation of New York Application December 7, 1950, Serial No. 199,685

3 Claims. (Cl. 51—164)

This invention relates to apparatus for tumbling rubber articles to remove the mold flash or rind therefrom and is especially useful in tumbling molded rubber articles while freezing the rubber.

Heretofore it has been proposed to remove the rind or mold flash from molded rubber articles by freezing the rubber to make the normally flexible rind brittle and then tumbling the frozen articles to break the rind therefrom. After removal of the tumbled articles, it has been necessary to separate the articles from the material removed therefrom.

It is an object of the present invention to provide for tumbling the articles at a reduced temperature and to separate the articles from other material in a single apparatus.

Other objects are to provide for removing the rind particles or trimmings from the molded articles in advance of unloading of the articles from the apparatus, to provide for preventing egress of the molded articles from the apparatus until after removal of the trimmings therefrom, to provide for unloading the apparatus while the drum is rotating, to reduce heat losses, to reduce manual handling and to provide efficiency and economy of operation.

These and other objects will appear from the following description and the accompanying drawings.

Of the drawings,

Fig. 4 is a sectional view of the delivery end of the apparatus taken on line 4—4 of Fig. 2 showing the closure member in retracted position, the closed position of the closure member being indicated in dot and dash lines, parts being broken away.

Figure 1:
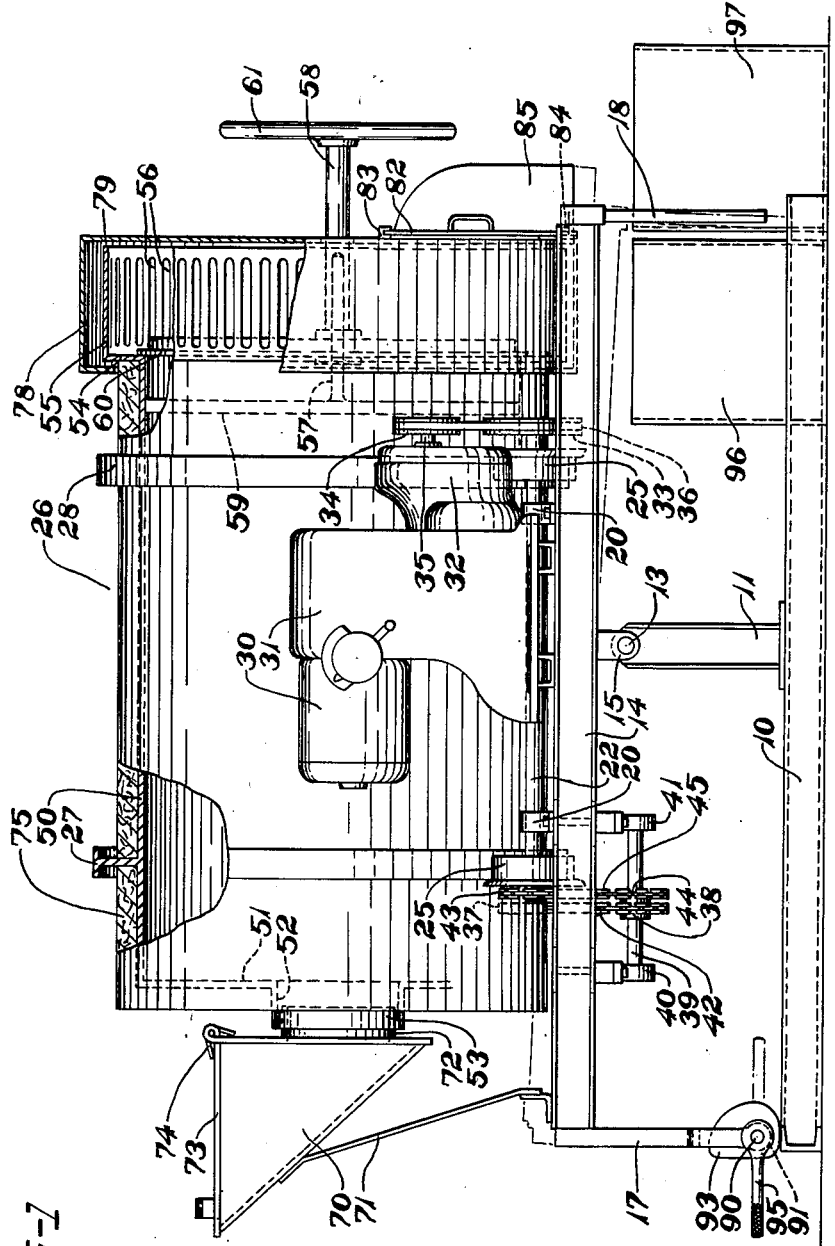
Fig. 1 is a side elevation of apparatus constructed in accordance with and embodying the invention, parts being broken away and parts shown in section.
Figure 2:
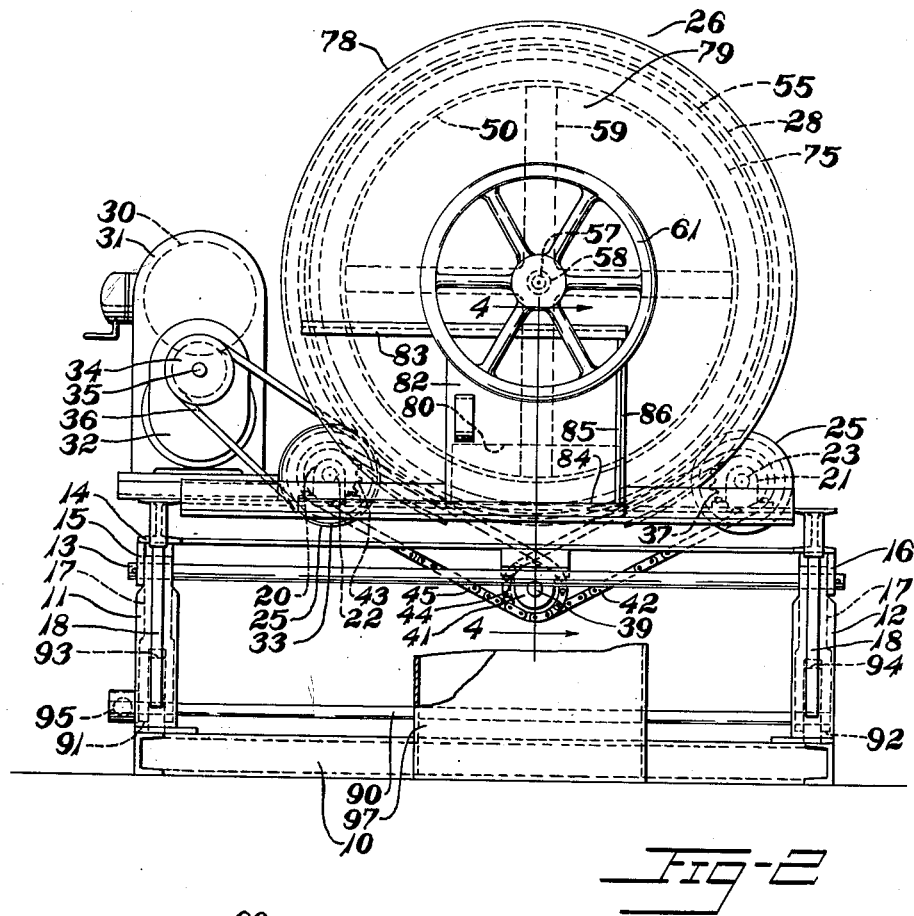
Fig. 2 is an end view thereof.
Figure 3:
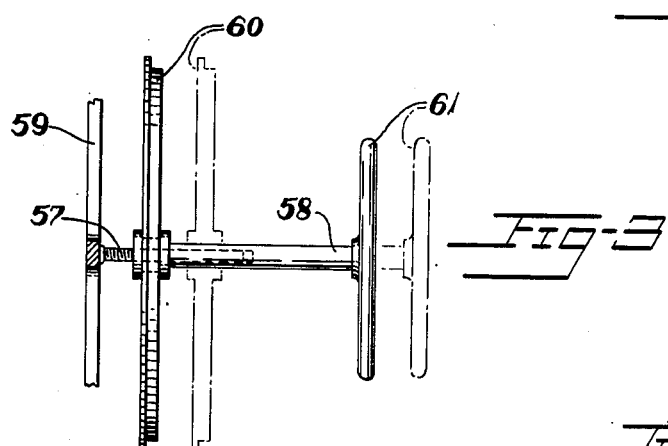
Fig. 3 is a detail view of the end closure member.

Referring to the drawings, the numeral 10 designates a stationary frame having a pair of vertical supports 11, 12 for supporting a fulcrum shaft 13. A rocking frame 14 is provided with fulcrum bearings 15, 16 engaging about shaft 13. The frame 14 is provided with legs 17, 18 at its opposite ends which extend downwardly short of the frame 10 for limiting rocking movement of the frame 14 by contact with frame 10. The fulcrum shaft 13 is so located relative to the center of gravity of the mechanism supported on frame 14 as to cause the frame 14 to rest normally in a horizontal position as shown in full lines in Fig. 1 with the legs 17 resting upon frame 10.

Frame 14 is provided at its sides with bearings 20, 21 for rotatably supporting a pair of parallel cradle shafts 22, 23 having cradle rollers 25 fixed thereto. A cylindrical tumbling barrel 26 has runner rails 27, 28 thereabout for resting on the cradle rolls.

For driving the cradle rolls, an electric motor 30 is mounted on a frame 31 which in turn is secured to frame 14. A variable speed reducer 32 is also mounted on frame 31 and is driven by motor 30. A V-belt pulley 33 is secured to shaft 22. A similar pulley 34 is fixed to the output shaft 35 of the speed reducer 32. A V-belt 36 connects these pulleys. Shaft 23 has a sprocket 37 fixed thereto. A sprocket 38 is secured to a countershaft 39 mounted in bearings 40, 41 secured to frame 14. A chain 42 transmits power from sprocket 38 to sprocket 37. Shaft 22 has a sprocket 43 fixed thereto which drives a sprocket 44 fixed to countershaft 39 through a chain 45.

The tumbling drum 26 has a cylindrical shell member 50 to which the runners 27, 28 are secured. One end of the shell is provided with a fixed head 51 having a central opening 52 surrounded by a tubular extension 53. The opposite end of the shell 50 has an outwardly extending flange 54 to which is secured a cylindrical screen extension 55 of considerably larger diameter than the shell 50. The screen is of slotted metal having elongate parallel slots 56 arranged parallel to the axis of the drum.

For closing the screen end of the shell 50, a spider 59 is fixed to the shell and has a threaded stud 57 fixed to its central hub. A tubular shaft 58 has threaded engagement with and fits telescopically over the stud. A closure disc 60 large enough to overlap the opening in the shell has a central apertured hub fixed to the tubular shaft 58. A hand wheel 61 is also fixed to the end of the shaft 58. The arrangement is such that by turning the hand wheel 61 the closure disc 60 may be moved inwardly to close the cylindrical drum from the screen extension as shown in Fig.

1 or may be moved outwardly to the open end of the screen portion as shown in Fig. 4.

For loading the drum, a hopper 70 is provided. It is supported from frame 14 as by struts 71. A tubular extension 72 of the hopper serves as a slip connection to the drum and enters the flange 53. A lid 73 is provided for the hopper and is mounted upon spring hinges 74 so as to be normally closed to prevent heat losses.

The drum 26 is provided with a lagging 75 for preventing heat losses.

A stationary casing 78 surrounds the perforated extension 55. It is mounted on the frame 14 and is closed at the right end as seen in Fig. 1 by a wall 79 having a central opening for clearing the shaft 58 and is otherwise closed except for a rectangular unloading opening 80 normally closed by a sliding door 82 guided by slides 83, 84. The door has a guide flange 85 secured thereto and a similar flange 86 is mounted on the wall 79 adjacent the opening. These guide flanges are to direct articles unloaded from the drum when the door 82 is opened.

For tipping the frame 14 and the rotatable drum thereon about axis 13, a cam shaft 90 extends through bearings 91, 92 of legs 17. A pair of cams 93, 94 and a lever 95 are fixed thereto. Cams 93, 94 rest upon the frame 10 and the arrangement is such that by throwing the lever to the dot-and-dash line position of Fig. 1, the axis of the drum 26 is inclined downwardly at the discharge end thereof.

In building the apparatus the length of the extension 55 is made greater than the greatest dimension of the articles to be handled so that with the cover or closure disc 60 displaced to the position shown in Fig. 4 or to the margin of the extension the articles 100 may be manipulated on the screen. The slots 56 are made elongate so as to permit long rind strips 101 to drop through into a container 96. A container 97 is provided below the door 82 to receive the trimmed articles. Also, the closure member 60 is made of such smaller diameter than that of the screen as to permit the articles to pass therebetween through the space 102 to the opening 80 as shown in Fig. 4.

In the operation of this apparatus, with the drum on a horizontal axis, the closure disc 60 in a position closing off the drum from the screen extension as shown in Fig. 1, and the drum rotating, the lid 73 of the hopper 70 is opened and the molded articles together with a quantity of solid carbon dioxide or Dry Ice is inserted in the drum. The carbon dioxide reduces the temperature of the drum and the articles to a degree at which the mold flash or rind on the articles becomes brittle and is removed by the tumbling action. With the drum still rotating, the closure disc 60 is backed away from the drum by manipulation of the hand wheel to the position of Fig. 4 exposing the screen extension. The drum is then tipped to incline its axis. The material is delivered to the screen extension where the detached trimmings fall through the screen into the container 96. After the trimmings have been separated, the door 82 is opened and the trimmed articles are delivered to the container 97.

Variations may be made without departing from the scope of the invention as it is defined by the following claims.

I claim:

1. Apparatus for removing and separating mold rind from molded articles in the presence of a refrigerant, said apparatus comprising a heat-insulated rotatable cylindrical drum having a charging aperture at one end thereof for receiving molded articles and refrigerant and having an unobstructed discharge aperture equal in area to the cross-section of the drum at the opposite end thereof, a cylindrical screen extension mounted on the drum coaxially thereof beyond its discharge aperture for rotation with the drum, said screen extension being of greater diameter than the drum, a circular closure member mounted coaxially of said drum for axial movement from a position obstructing said discharge aperture to a position spaced from said discharge aperture within said screen extension to permit passage of molded articles axially of said extension between said closure member and said extension, a stationary enclosure about said extension, said enclosure having openings therethrough for egress therethrough respectively of trimmed molded articles and rind, and means extending through and beyond said enclosure and operable during rotation of said drum for so moving said closure member to open and close said drum.

2. Apparatus for removing and separating mold rind from molded articles in the presence of a refrigerant, said apparatus comprising a heat-insulated rotatable cylindrical drum having a charging aperture at one end thereof for receiving molded articles and refrigerant and having an unobstructed discharge aperture equal in area to the cross-section of the drum at the opposite end thereof, a cylindrical screen extension mounted on the drum coaxially thereof beyond its discharge aperture for rotation with the drum, said screen extension being of greater diameter than the drum and having axially extending slots therethrough of such size as to permit egress of rinds and to prevent egress of molded articles, a circular closure member mounted coaxially of said drum for axial movement from a position obstructing said discharge aperture to a position spaced from said discharge aperture within said screen extension to permit passage of molded articles axially of said extension between said closure member and said extension, a stationary enclosure about said extension, said enclosure having openings therethrough for egress therethrough respectively of trimmed molded articles and rind, and means extending through and beyond said enclosure and operable during rotation of said drum for so moving said closure member to open and close said drum.

3. Apparatus for removing and separating mold rind from molded articles in the presence of a refrigerant, said apparatus comprising a heat-insulated rotatable cylindrical drum having a charging aperture at one end thereof for receiving molded articles and refrigerant and having an unobstructed discharge aperture equal in area to the cross-section of the drum at the opposite end thereof, a cylindrical screen extension mounted on the drum coaxially thereof beyond its discharge aperture for rotation with the drum, said screen extension being of greater diameter than the drum and having axially extending slots therethrough of such size as to permit egress of rind and to prevent egress of molded articles, a circular closure member mounted coaxially of said drum for axial movement from a position obstructing said discharge aperture to a position spaced from said discharge aperture within said screen extension, the periphery of said closure member being spaced from the peripheral wall of said screen extension by a sufficient distance at all relative positions thereof beyond the drum closing position to permit passage of molded articles axially of said extension between said closure member and said extension, a stationary enclosure about said extension, said enclosure having openings therethrough for egress therethrough respectively of trimmed molded articles and rind, and means extending through and beyond said enclosure and operable during rotation of said drum for so moving said closure member to open and close said drum.

WALTER J. STRONG.

REFERENCES CITED

The following references are of record in the file of this patent:

UNITED STATES PATENTS

| Number | Name | Date |
| --- | --- | --- |
| 458,571 | Gedge | Sept. 1, 1891 |
| 1,702,759 | Barber | Feb. 19, 1929 |
| 1,826,822 | Ransohoff | Oct. 13, 1931 |
| 2,131,260 | Temple | Sept. 27, 1938 |
| 2,390,011 | Thompson | Nov. 27, 1945 |